US011158106B2

(12) United States Patent
Saleh et al.

(10) Patent No.: US 11,158,106 B2
(45) Date of Patent: Oct. 26, 2021

(54) VRS RATE FEEDBACK

(71) Applicant: Advanced Micro Devices, Inc., Santa Clara, CA (US)

(72) Inventors: Skyler Jonathon Saleh, La Jolla, CA (US); Vineet Goel, La Jolla, CA (US); Pazhani Pillai, Boxborough, MA (US); Ruijin Wu, La Jolla, CA (US); Christopher J. Brennan, Boxborough, MA (US); Andrew S. Pomianowski, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/723,969

(22) Filed: Dec. 20, 2019

(65) Prior Publication Data

US 2021/0192827 A1 Jun. 24, 2021

(51) Int. Cl.
*G06T 15/00* (2011.01)
*G06T 1/20* (2006.01)
*G06T 1/60* (2006.01)

(52) U.S. Cl.
CPC .............. *G06T 15/005* (2013.01); *G06T 1/20* (2013.01); *G06T 1/60* (2013.01); *G06T 2210/52* (2013.01)

(58) Field of Classification Search
CPC ........... G06T 15/005; G06T 1/20; G06T 1/60; G06T 2210/52
See application file for complete search history.

(56) References Cited

U.S. PATENT DOCUMENTS

| 2018/0061122 | A1* | 3/2018 | Clarberg | ................... G06T 1/20 |
| 2019/0005713 | A1* | 1/2019 | Nevraev | ................. G06T 17/10 |

* cited by examiner

*Primary Examiner* — Chong Wu
(74) *Attorney, Agent, or Firm* — Volpe Koenig

(57) ABSTRACT

Techniques for performing shader operations are provided. The techniques include, performing pixel shading at a shading rate defined by pixel shader variable rate shading ("VRS") data, updating the pixel VRS data that indicates one or more shading rates for one or more tiles based on whether the tiles of the one or more tiles include triangle edges or do not include triangle edges, to generate updated VRS data, and writing a VRS rate feedback buffer based on the updated VRS data.

20 Claims, 7 Drawing Sheets

VRS RATE FEEDBACK

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads—a block of 2×2 pixels—and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve efficiency of pixel shading.

BRIEF DESCRIPTION OF THE DRAWINGS

A more detailed understanding can be had from the following description, given by way of example in conjunction with the accompanying drawings wherein.

DETAILED DESCRIPTION

Techniques for performing shader operations are provided. The techniques include, performing pixel shading at a shading rate defined by pixel shader variable rate shading ("VRS") data, updating the pixel VRS data that indicates one or more shading rates for one or more tiles based on whether the tiles of the one or more tiles include triangle edges or do not include triangle edges, to generate updated VRS data, and writing a VRS rate feedback buffer based on the updated VRS data.

Figure 1:
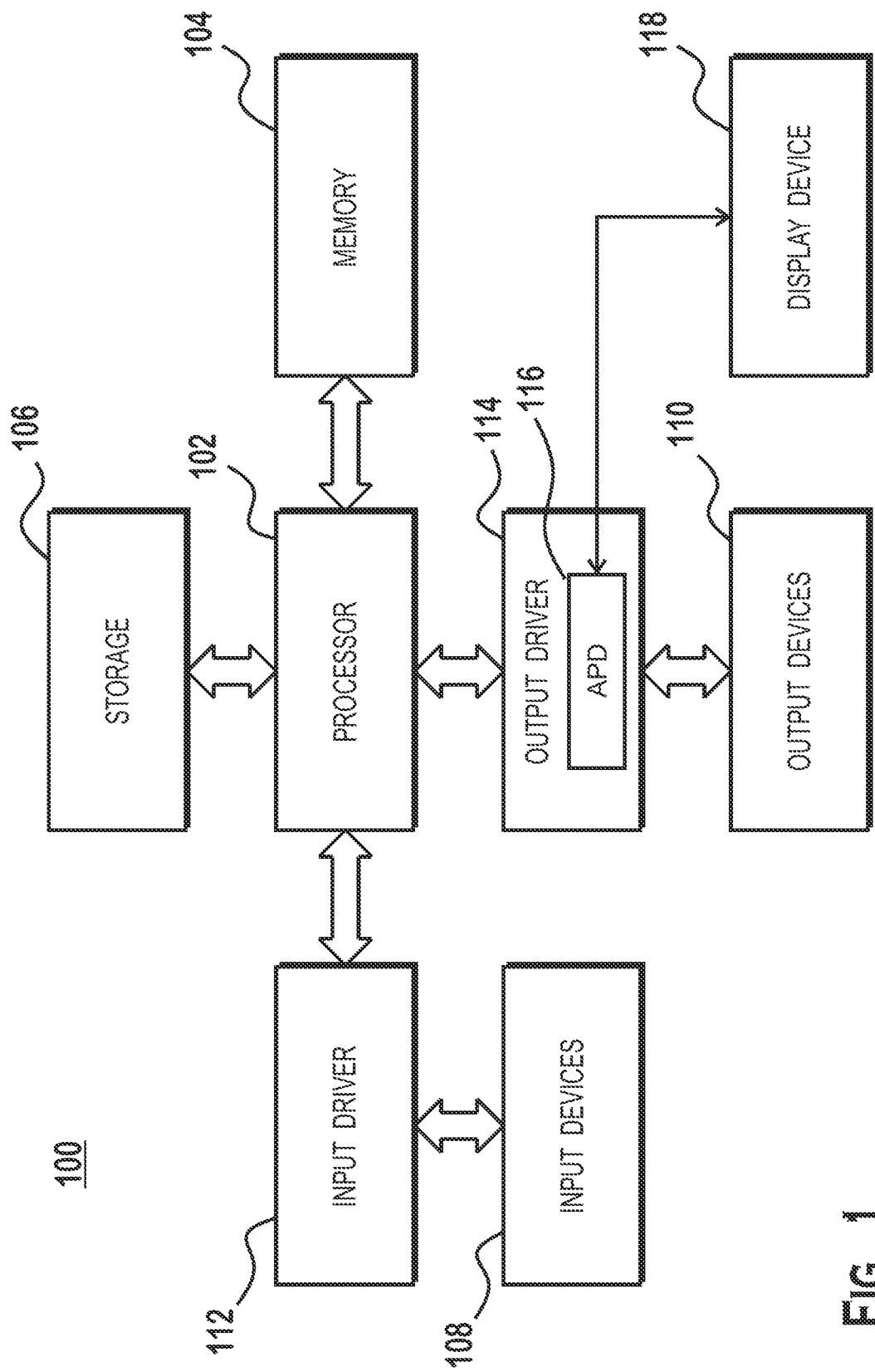
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
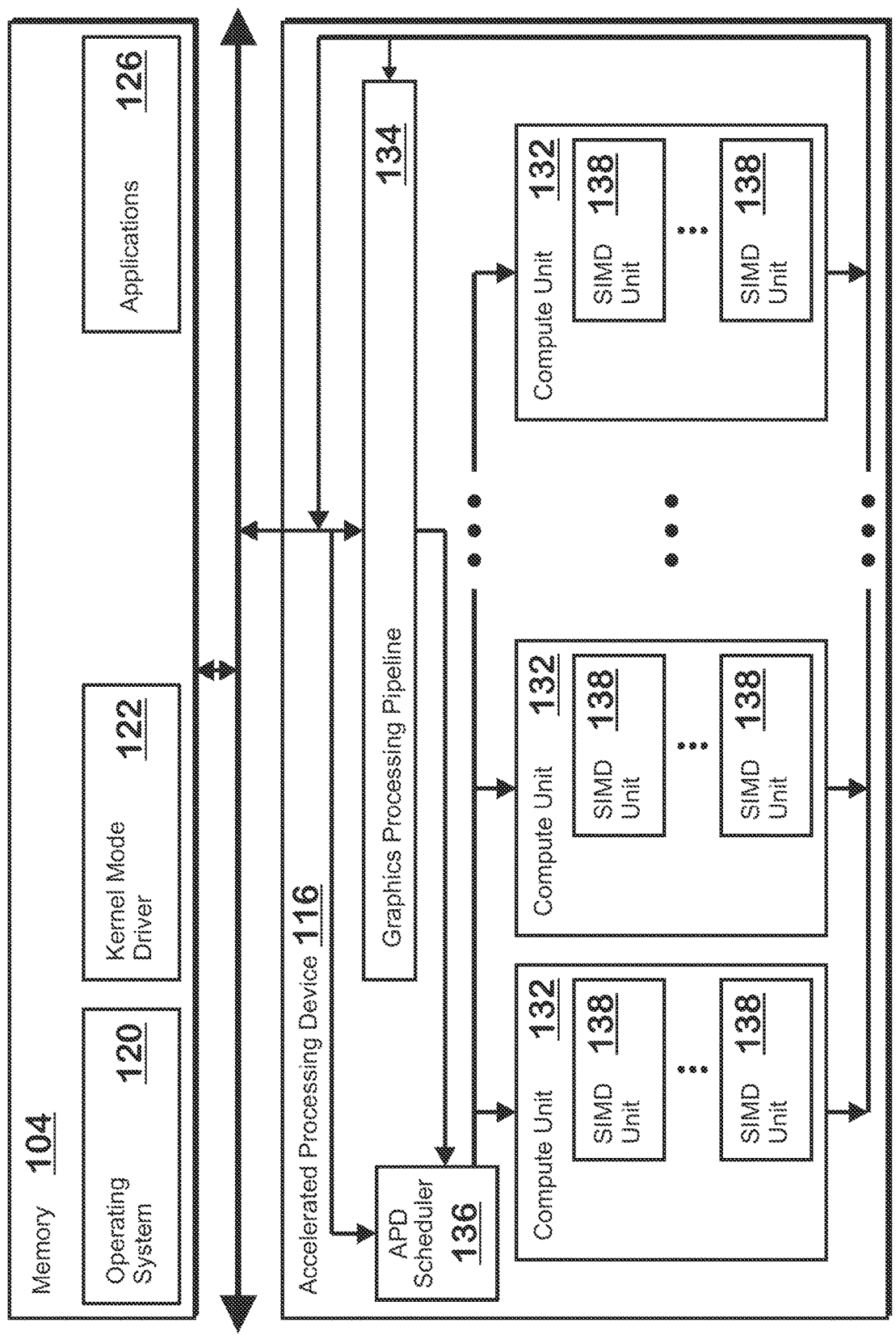
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
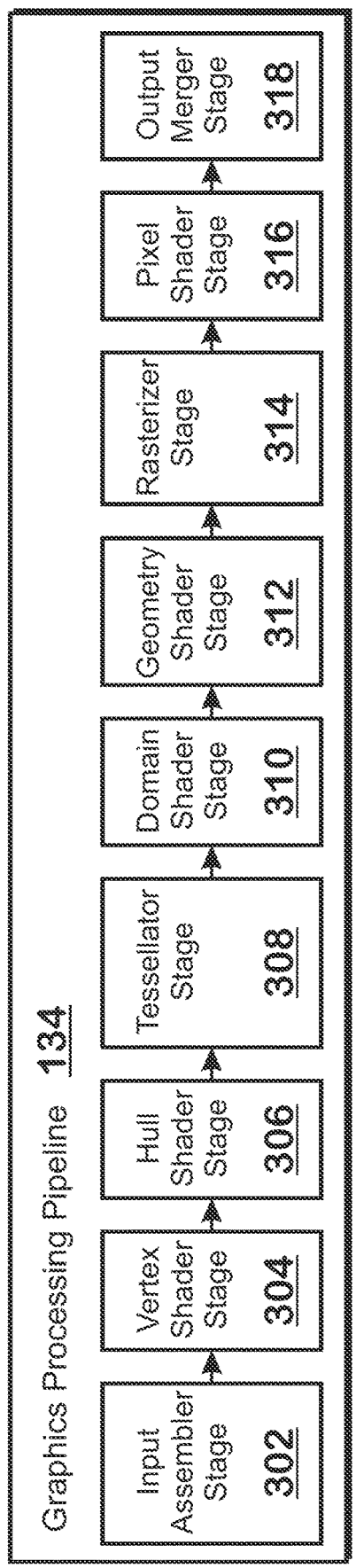
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In one mode of operation, the rasterization performed by the rasterizer stage 314 is done at the same resolution as pixel shading performed by the pixel shader stage 316. By way of more detailed background than the description provided above, the rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written).

Typically, the fragments are grouped into quads, each quad including fragments corresponding to four neighboring pixel locations (that is, 2×2 fragments). Scan conversion of a triangle involves generating a fragment for each pixel location covered by the triangle. If the render target is a multi-sample image, then each pixel has multiple sample locations, each of which is tested for coverage. The fragment records coverage data for the samples within the pixel area that are covered by the triangle. The fragments that are generated by the rasterizer stage 314 are transmitted to the pixel shader stage 316, which determines color values for those fragments, and may determine other values as well.

Performing rasterization and pixel shading at the same resolution means that for each fragment generated by the rasterizer, the pixel shader 316 performs a calculation to determine a color for that fragment. In other words, the area of screen-space occupied by a pixel is the same area as the precision with which colors are determined. In one example, in the SIMD-based hardware of the compute units 132, each fragment generated by the rasterizer stage 314 is shaded by a different work-item. Thus, there is a one-to-one correspondence between generated fragments and work-items spawned to shade those fragments. Note that the rasterizer stage 314 typically performs depth testing, culling fragments occluded by previously-rendered fragments. Thus, there is a one-to-one correspondence between fragments that survive this depth culling and work-items spawned to color those surviving fragments. Another way to understand the mode of operation in which rasterization is performed at the same resolution as shading is that the resolution at which the edges of a triangle can be defined is equivalent to the resolution at which colors of that triangle can be defined.

One issue with the above mode of operation, in which rasterization occurs at the same resolution as pixel shading occurs for triangles that have a fixed color or low frequency change in color. For such triangles, pixel shading operations on nearby fragments produce the same or similar color and are effectively redundant. A similar result could therefore be performed with a much smaller number of pixel shader operations. Thus, it is advantageous to decouple the rasterization resolution from the shading resolution, and a technique for allowing rasterization to occur at a different resolution than pixel shading is provided below. The advantage of such a technique is a reduction in the number of pixel shader operations being performed, which reduces processing load and improves performance.

Figure 4:
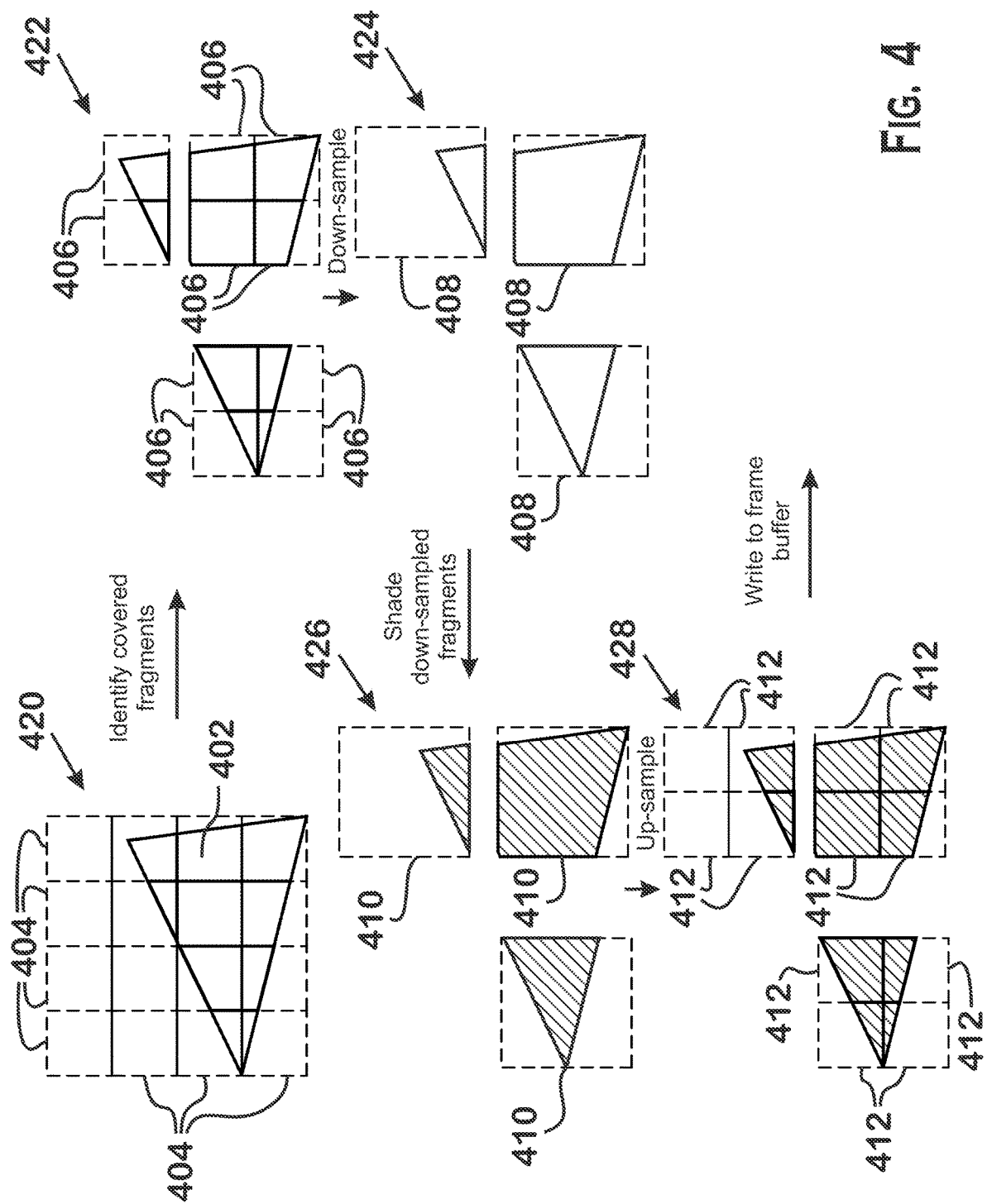
FIG. 4 illustrates operations for a variable rate shading technique, according to an example.

FIG. 4 illustrates a variable rate shading ("VRS") technique according to an example. At state 420, the rasterizer stage 314 receives a triangle 402 having vertices that define positions with respect to screen pixels 404. At state 422, the rasterizer stage 314 identifies fragments 406 covered by the triangle 402. A fragment 406 is a data item corresponding to a screen pixel 404 that indicates that at least one sample position within that screen pixel 404 is covered by a triangle 402. In state 422, each of the fragments 406 illustrated has at least one sample position covered by triangle 402. A "screen pixel" is an area of a render target (portion of memory to which pipeline output is written) for which rendering output is written. A render target includes multiple pixels, each of which includes data such as color data and potentially other data. Although the term "screen pixel" is used, it should be understood that this term sometimes means a pixel of any render target, and not necessarily a render target that is output for display on a screen.

At state 424, the rasterizer stage 314 down-samples the covered fragments 406 illustrated at state 422. Down-sampling involves creating coarse fragments 408 that each correspond to at least one covered fine fragment 406 (where fragments 406 are called fine fragments as the fragments 406 cover a smaller screen area than the coarse fragments). The coarse fragments are created so that when shading occurs by the pixel shader stage 316, the amount of shading that needs to occur is reduced. Thus at state 426, the pixel shader stage 316 shades the coarse fragments to generate shaded coarse fragments 410. At state 428, the output merger stage 318 up-samples the shaded coarse fragments 410 to generate up-sampled (or "fine") fragments 412. Up-sampling involves generating multiple up-sampled fragments 412 from one or more coarse fragments 410, where each up-sampled fragment 412 has the same color as the color generated for the corresponding coarse fragment 410 and falls within the render target area defined for the coarse fragment. The output merger stage 318 then writes the up-sampled fragments 412 to the render target surface.

It should be noted that although the variable rate shading technique of FIG. 4 reduces the amount of work performed by the pixel shader 316, other steps are beneficially used to improve the performance of other graphics processing operations. More specifically, the variable rate shading technique obtains data indicating shading rates for different shading rate tiles of a render target. A shading rate tile is a portion of a render target including multiple pixels. The shading rates are defined at the granularity of the shading rate tiles. The shading rate for a particular tile indicates the rate at which shading is performed for the fragments within that tile. For example, a 4:1 shading rate means that a single pixel shader work-item is used to shade fragments for four different pixels. The data indicating the shading rates ("shading rate data") for the different shading rate tiles is obtained in any technically feasible manner, such as from within data specified by an application, within data determined automatically by a portion of the graphics processing pipeline 300 based on characteristics of the scene being rendered, or based on any other technically feasible technique. In some examples, shading rate data is specified in a shading rate map that indicates which portions of the render target are to receive which shading rate. In some examples, shading rate data is specified on a per-triangle basis, where each triangle has an associated shading rate. In some examples, the shading rate data is specified on a per-triangle and per-tile basis, in which tiles within triangles are permitted to have different shading rates.

As described above, this shading rate data is used to reduce the amount of work performed at the pixel shader stage 316. This shading rate data is also beneficially used for other purposes such as to reduce the amount of work performed by post-processing tasks. A post-processing task is a task performed on data within a render target such as the frame buffer and serves to modify that data or generate additional data to achieve a visual effect or other effect. Some example post processing tasks include generating direct shadows via a ray tracing or rasterization technique, generating direct lighting using a compute technique, generating reflections, generating global illumination using a ray tracing technique, ambient occlusion using ray tracing or a compute technique, generating transparency and translucency effects using a ray tracing technique, and performing other post processing operations such as camera lens related effects like simulating shallow depth of field.

It is possible for any such technique to use shading rate data to reduce the amount of processing performed by that technique. However, such techniques cannot use the same data as the data provided as input to the graphics processing pipeline 300 for the purpose of reducing the amount of work performed by the techniques. Specifically, at the edges of triangles, such techniques generally should be performed at a rate that is not reduced according to the shading rate data, otherwise it is possible for the edges of triangles to have obvious artifacts. However, the shading rate data for a tile when used for pixel shading is agnostic as to whether the tile includes a triangle edge. Therefore, the graphics processing pipeline 300 modifies the shading rate data that is used to reduce the shading rate at the pixel shader into post-processing shading rate data. Specifically, the graphics processing pipeline 300 maintains the shading rate used for the pixel shader except where a triangle that is visible in the final rendered image embodied in the render target has an edge through a tile. In the situation where such a triangle exists in a tile, the graphics processing pipeline 300 sets the shading rate for the tile for post-processing techniques to indicate that such a triangle edge exists in that tile. In various examples, the post-processing techniques treat such a tile as a tile that is to be processed at the resolution of the render target (i.e., a resolution that is not reduced per the shading rate data). Note the term "final rendered image" above means the image in the render target after no more updates from the graphics processing pipeline 300 are applied to the render target. Where the render target is the frame buffer, the "final rendered image" is the image that is displayed on the screen.

Figure 5:
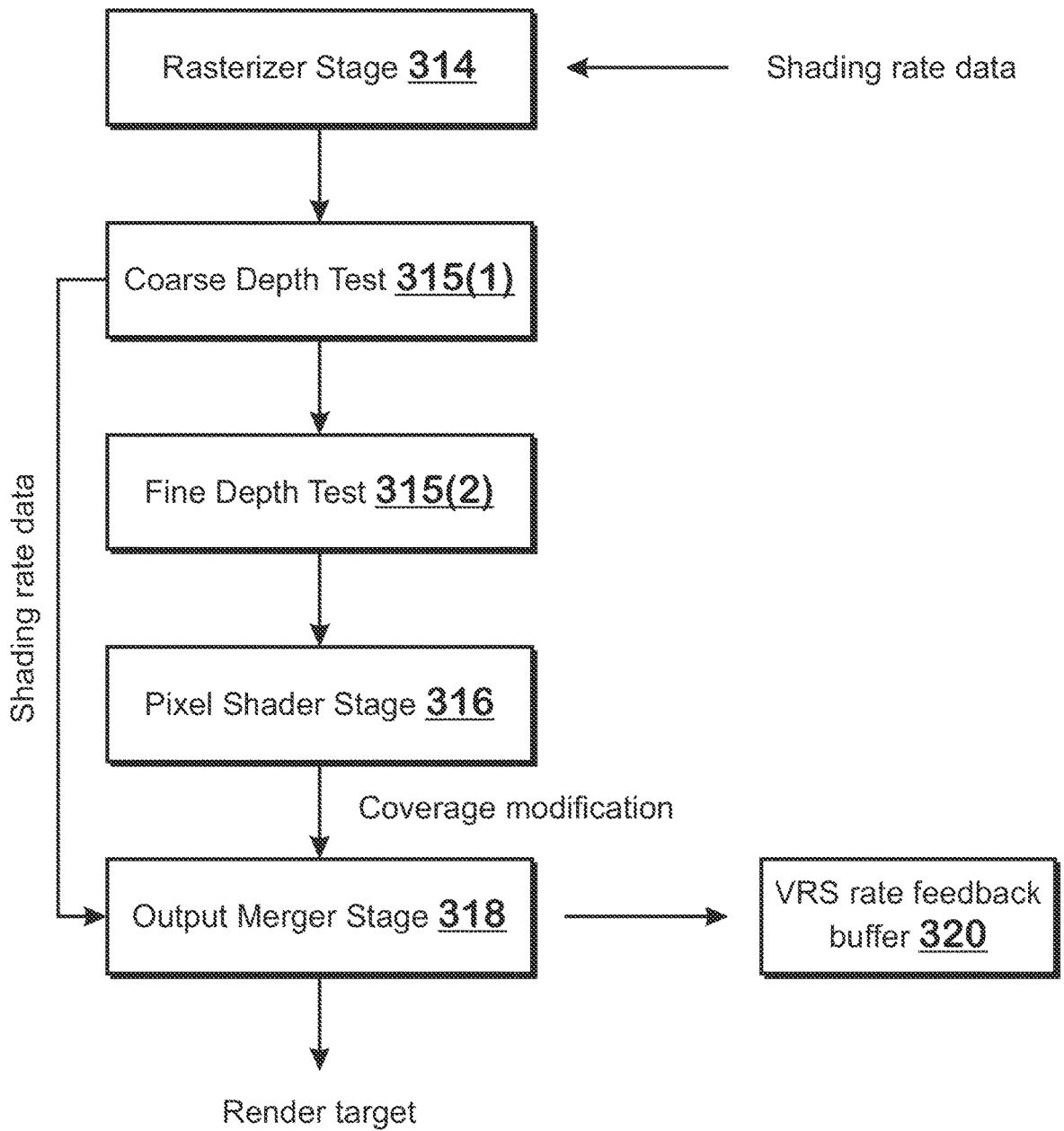
FIG. 5 illustrates operations of the graphics processing pipeline related to generating a VRS rate feedback buffer, according to an example.

FIG. 5 illustrates operations of the graphics processing pipeline 300 related to generating a VRS rate feedback buffer, according to an example. The VRS rate feedback buffer includes data that indicates the shading rate to be used for each tile for post-processing tasks. FIG. 5 illustrates a portion of the pipeline stages of FIG. 3 and also includes some pipeline stages not illustrated in FIG. 3. Specifically, the rasterizer stage 314 is shown, which feeds into a coarse depth test block 315(1), a fine depth test block 315(2), the pixel shader stage 316, and the output merger stage 318.

The rasterizer stage 314 accepts shading rate data and triangles from earlier in the graphics processing pipeline 300. The rasterizer 314 rasterizes the triangles to generate fragments based on the shading rate. As described elsewhere herein, the shading rate data indicates, for each tile, the rate at which the pixel shader 316 is to shade that tile. A tile is a portion of the area represented in a render target. The rasterizer 314 generates fragments based on this shading rate data and passes the shading rate data and the fragments to the coarse depth test block 315(1) and the output merger stage 318. The coarse depth test block 315(1) performs a coarse depth test. The coarse depth test involves determining whether all fragments of a tile are occluded by all fragments in tiles previously encountered by the coarse depth test unit 315(1). The coarse depth test is conservative, meaning that the coarse depth test block 315(1) rejects all fragments of a tile if all fragments in the tile are occluded by all fragments of a previously seen tile but does not reject any of the fragments of the tile if at least one fragment in the tile is not occluded by a any fragment of a previously seen tile. In some implementations, the tiles for which this coarse depth test is performed are the same size as the tiles for which the shading rates are specified by the shading rate data.

The fine depth test 315(2) performs a depth test for individual fragments of the tiles that survive the coarse depth test 315(1). More specifically, the fine depth test 315(2) receives the fragments of tiles that survive the coarse depth test and compares the depths of those fragments to the depths of fragments previously seen by the fine depth test block 315(2). The fine depth test 315(2) rejects fragments on a per-fragment basis, rather than on a per-tile basis. In some examples or modes of operation, if a fragment is considered to be occluded by a previously seen fragment, then that fragment is discarded and if a fragment is considered to be not occluded by a previously seen fragment, then that fragment is sent to the pixel shader stage 316 for pixel shading. In other examples or modes of operation, the fine depth test 315(2) performs one of a selectable test that does not necessarily indicate whether a fragment is occluded to determine whether to discard or keep a fragment. Note that at this stage, the fragments have the size as determined by the shading rate data, since those are the fragments that are output by the rasterizer stage 314. In other words, the fragments to be shaded at the pixel shader stage 316 have a size on the render target that corresponds to the shading rate—coarser fragments take up a larger area on the render target than finer fragments.

The pixel shader stage 316 shades the fragments that survive the fine depth test 315(2) and outputs the shaded fragments to the output merger stage 318. The output merger stage 318 performs final operations such as a final depth test (in case depth is modified by the pixel shader stage 316), and writes the shaded fragments to a render target.

The output merger stage 318 generates the VRS rate feedback buffer 320 based on shading rate data received from the coarse depth test 315(1) as well as based on coverage modification, if any, that occurs at the pixel shader stage 316. The VRS rate feedback buffer 320 is the data structure that stores information about what shading rate to use for post-processing tasks. Thus when post-processing tasks occur, the post-processing tasks read the VRS rate feedback buffer 320 and perform operations based on the shading rate in the VRS rate feedback buffer 320.

The output merger stage 318 generates the VRS rate feedback buffer 320 in the following manner. The output merger stage 318 receives shading rate data from the coarse depth test block 315(1), as modified by that block in consideration of whether a tile includes a triangle edge. More specifically, the coarse depth test block 315(1) receives fragments generated by the rasterizer stage 314 and receives the shading rate data. The coarse depth test block 315(1) performs the coarse depth test 315(1) for fragments within a tile. If all fragments within a tile are considered to pass the coarse depth test, then the coarse depth test block 315(1) passes shading rate data for that tile to the output merger stage 318, where the shading rate data indicates the shading rate specified by the shading rate data input to the rasterizer stage 314. In other words, in the scenario where a tile is fully uncovered by previously seen tiles, the shading rate data passed from the coarse depth test block 315(1) to the output merger stage 318 for that tile is the shading rate specified for pixel shading to the rasterizer stage 314.

If no fragments within a tile are considered to pass the coarse depth test, then the entire tile of fragments is culled and the coarse depth test 315(1) does not pass any shading rate data for that tile to the output merger stage 318. If some fragments within a tile are considered to pass the coarse depth test and some fragments within the tile are considered to not pass the coarse depth test, then the coarse depth test 315(1) provides an indication for that tile to the output merger stage 318 indicating that that tile includes a triangle edge. As described elsewhere herein, in some implementations, a post-processing task that receives this indication performs post-processing operations at the resolution of the render target instead of the reduced resolution performed by the pixel shader stage 316. A post-processing task that receives an indication of the pixel shading VRS data performs post-processing operations at that resolution, which, in some examples is different than the resolution of the render target (for example, coarser).

The output merger stage 318 receives the per-tile shading rate data from the coarse depth test 315(1) and determines whether to modify that per-tile shading rate data based on output from the pixel shader stage 316. More specifically, it is possible for the pixel shader stage 316 to modify aspects of fragments being shaded such that a fragment that is considered visible by the coarse depth test block 315(1) is no longer visible after modification by the pixel shader stage 316.

In an example, the pixel shader stage 316 processes fragments of a tile that is marked as fully not occluded by the coarse depth test block 315(1). The pixel shader stage 316 marks a particular fragment of that tile as not covered (the term "covered" means "covered by a triangle and thus able to be rendered—a non-covered fragment is not visible and thus is not rendered to the render target). If other fragments of that tile remain covered, then the tile is not fully covered and the output merger stage 318 modifies the shading rate data received from the coarse depth test block 315(1) to include an indication that the tile includes a triangle edge and thus is to be processed in post-processing at the resolution of the render target rather than at the reduced resolution that the pixel shader stage 316 operates at. More specifically, because the tile is determined to be fully non-occluded by the coarse depth test block 315(1), but after the pixel shader stage 216, the tile is not fully visible (due to coverage being modified), the fragments of the tile cannot be post-processed at the reduced shading rate and therefore the output merger stage 318 sets the shading rate for that tile to indicate that the tile includes a triangle edge.

In another example, the pixel shader stage 316 processes fragments of a tile that is marked as fully not occluded by the coarse depth test block 315(1). The pixel shader stage 316 modifies the depth of some of the fragments of that tile such that those fragments are occluded by other fragments. In that situation, if at least some of the fragments are still visible, then the tile is not fully covered and the output merger stage 318 modifies the shading rate data received from the coarse depth test block 315(1) to include an indication that the tile includes a triangle edge.

The output merger stage 318 performs a depth comparison for the per-tile shading rate data, as modified per operations at the pixel shader stage 316, before writing such data to the VRS rate feedback buffer 320. More specifically, it is possible for the graphics processing pipeline 300 to process multiple sets of fragments for the same portion of the render target corresponding to a tile. In an example, the graphics processing pipeline 300 renders one triangle at a far depth, another triangle at an intermediate depth, and a third triangle at a close depth, where all such triangles cover the same render target area that corresponds to the same tile. In such instances, the VRS rate feedback buffer 320 includes data for the fragments that are actually present in the render target buffer. For example, if the third triangle fully occludes the first triangle and the second triangle within a particular tile, then the VRS rate feedback buffer should include the VRS rate for the third triangle at that tile. Note that if multiple triangles are visible in a tile, then the VRS rate feedback buffer 320 indicates that the tile includes a triangle edge.

In one example, the output merger stage 318 writes data for tiles that are visible in the VRS rate feedback buffer 320 in the following manner. The output merger stage 318 generates a coverage mask for fragments to be written to the frame buffer. The output merger stage 318 examines this coverage mask for each tile. For any particular tile, if all samples are considered covered, then the output merger stage 318 writes the value that the tile was rendered at to the VRS rate feedback buffer 320 for that tile. If some but not all samples are covered, then the output merger stage 318 writes the triangle edge value to the VRS rate feedback buffer 320 for that tile. If no samples are covered, then the output merger stage 318 does not write anything to the VRS rate feedback buffer 320 for that tile.

In another example, the output merger stage 318 achieves writing data for tiles that are visible in the VRS rate feedback buffer 320, in the following manner. The output merger stage 318 receives the shading rate data from the coarse depth test 315(1) and modifies the shading rate data per output from the pixel shading stage 316 as described elsewhere herein. The result is an item of shading rate data for the tile. This item of shading rate data has an associated depth, which is the depth of the fragment of the tile that is farthest from the camera (because the coarse depth test is conservative, the coarse depth test checks whether the farthest fragment of a tile is occluded by the closest depth for any tile already encountered by the coarse depth test). The output merger stage 318 writes this item of shading rate data to the VRS rate feedback buffer 320 if the depth of that tile is closer than the farthest depth of the VRS data item in the VRS rate feedback buffer 320 at the same tile location. In an example, the output merger stage 318 encounters VRS rate data for a tile having a depth of 10 (where higher depths are farther from the camera) and writes that VRS rate data to the VRS rate feedback buffer 320. Then the output merger stage 318 encounters VRS rate data for another tile at the same render target area as the depth-10 tile, but this new tile has a depth of 7. In response, the output merger stage 318 overwrites the shading rate data for the depth-10 tile in the VRS rate feedback buffer 320 with the shading rate data for the depth-7 tile.

After the render target frame has been fully rendered, the VRS rate feedback buffer 320 is considered finished for that frame. Subsequent post-processing tasks input this buffer and perform post-processing operations in accordance therewith.

One example of a technique for using the VRS rate feedback buffer 320 is now provided. In this example, a post-processing task is performed using a compute shader. The SIMD units 138 operate in two different modes. In a first mode, a first number of work-items (such as 32) are executed. In a second mode, a second number of work-items (such as 64) that is twice the first number are executed. In the second mode, the second number of work-items are executed by executing half of the work-items in turns. For example, for a first number of clock cycles, the first half of the work-items are executed and for a second number of clock cycles, the second half of the work-items are executed. In this example, a compute shader executes in the second mode and checks the VRS rate feedback buffer 320 to determine whether the shading rate is reduced. If the shading rate is reduced, then the shader program terminates the second half of the work-items, which causes the "turn" for the second half of the work-items to be skipped, thereby halving the execution time of the compute shader. Any other technique for reducing execution time of a post-processing task according to the shading rates specified in the VRS rate feedback buffer 320 is possible.

A post processing task is performed by a post-processing unit. A post-processing unit is any unit capable of performing a particular post-processing task. Example post-processing units include any portion of the graphics processing pipeline 134, any hardware, software, or combined hardware/software unit depicted in any of the Figures, or any other hardware, software or combined hardware/software unit.

Figure 6:
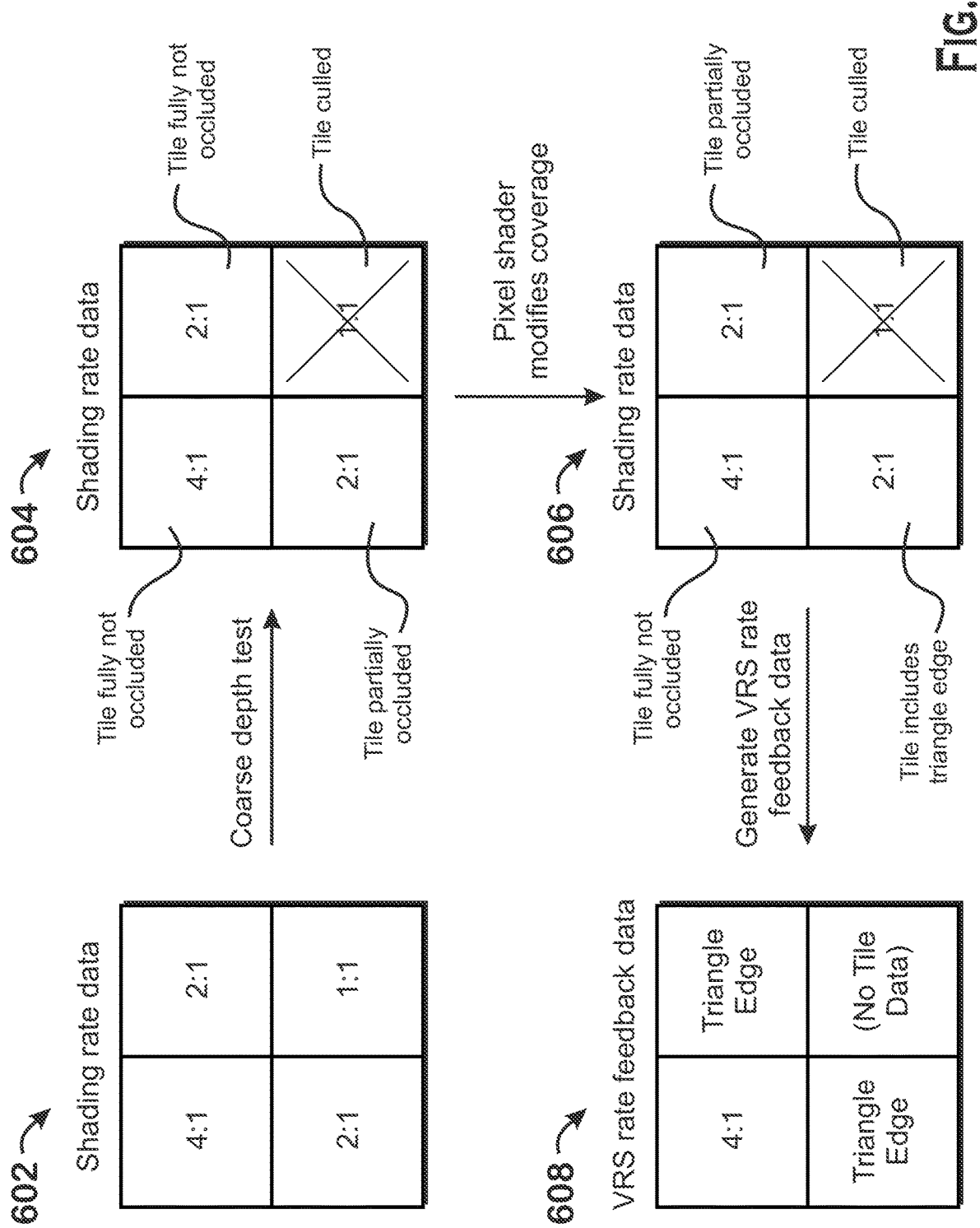
FIG. 6 illustrates an example series of operations for generating the VRS rate feedback buffer.

FIG. 6 illustrates an example series of operations for generating the VRS rate feedback buffer 320. At state 602, the shading rate data input to the rasterizer stage 314 is shown. A top-left tile has a 4:1 shading rate, the top-right and bottom-left tiles have 2:1 shading rates and the bottom-right tile has a 1:1 shading rate. The coarse depth test block 315(1) performs the coarse depth test, determining that the bottom-right tile is culled because that tile is occluded by a tile already encountered. The coarse depth test block 315(1) also determines that the bottom-right tile is partially occluded and that the top-right tile and top-left tile are fully not occluded.

At state 606, the pixel shader stage 316 has modified coverage. Specifically, the pixel shader stage 316 has modified some of the coverage of the bottom-left tile (for example, by setting one or more fragments to be not covered) and thus the bottom-left tile is indicated as including a triangle edge. State 608 shows the VRS rate feedback data as written to the VRS rate feedback buffer 320. The top-left tile includes the shading rate as indicated in state 602. The top-right and bottom-left tile indicates that there is a triangle edge. The bottom-right tile includes no data to be written to the VRS rate feedback buffer 320, because the corresponding tile was culled by the coarse depth test.

Figure 7:
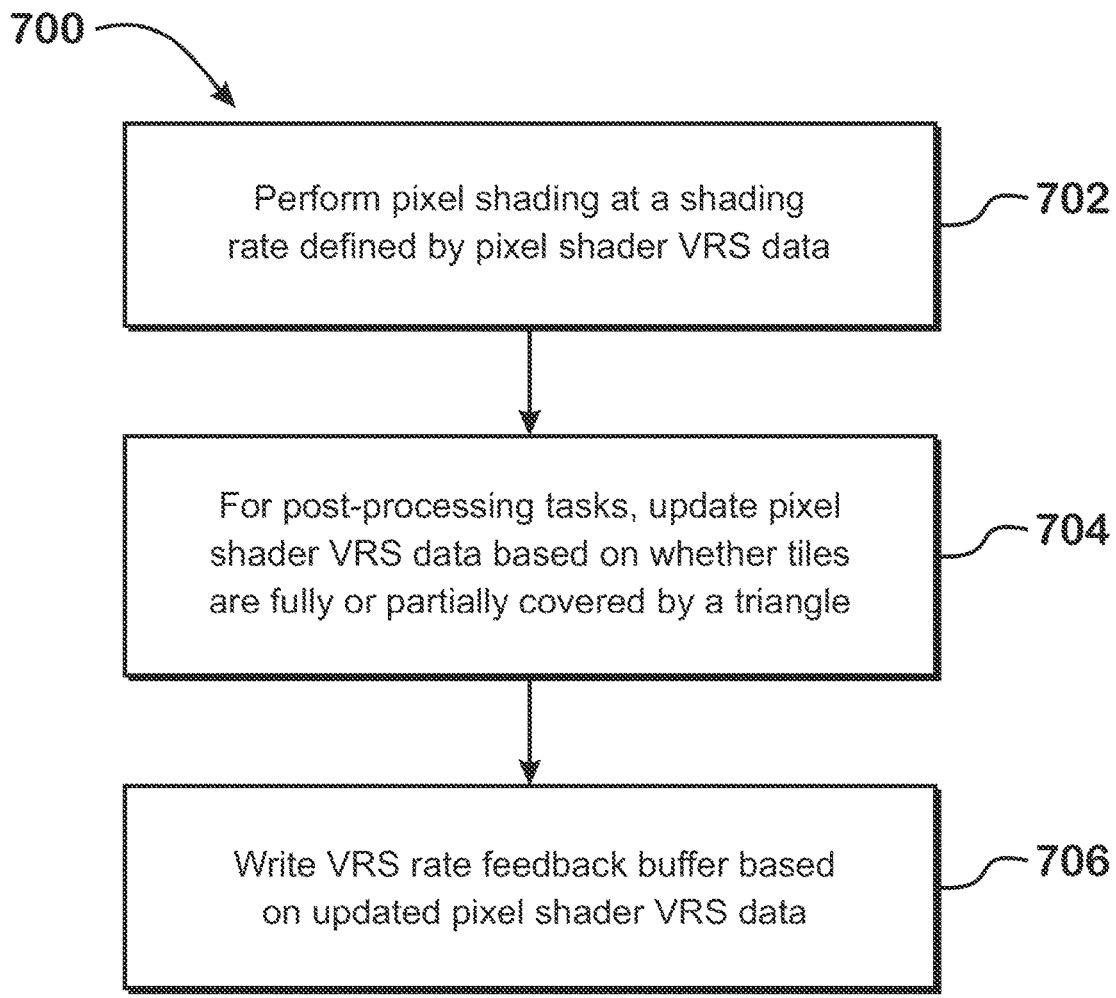
FIG. 7 is a flow diagram of a method for generating data for a VRS rate feedback buffer, according to an example.

FIG. 7 is a flow diagram of a method 700 for generating data for a VRS rate feedback buffer, according to an example. Although described with respect to FIGS. 1-6, those of skill in the art will understand that any system, configured to perform the steps of method 700 in any technically feasible order, falls within the scope of the present disclosure.

The method 700 begins at step 702, where the graphics processing pipeline 300 performs pixel shading at a shading rate defined by pixel shader variable rate shading ("VRS") data. At step 704, the graphics processing pipeline 300 updates pixel shader VRS data based on whether tiles are fully or partially covered by a triangle. The pixel shader VRS data is variable rate shading rates on a per-tile basis that is to be used by the pixel shader stage 316 to determine the pixel shading rate as described elsewhere herein. In some examples, this updating occurs by performing a coarse depth test. The coarse depth test determines whether tiles are fully occluded, partially occluded, or not occluded by previously seen tiles. In addition, in some examples, this updating occurs by observing whether the pixel shader stage 316 modifies coverage for fragments within the tile. If the pixel shader stage 316 modifies coverage such that a fully not occluded tile has at least one fragment that is not covered, then the graphics processing pipeline 300 modifies updates the VRS data for that tile to indicate that the tile includes a triangle edge.

At step 706, the graphics processing pipeline 300 writes the VRS rate feedback buffer 320 based on the updated pixel shader VRS data. In some examples, the graphics processing pipeline 300 writes a tile of updated pixel shader VRS data to the VRS rate feedback buffer 320 if the data in that buffer is occluded by the incoming tile of updated pixel shader VRS data and does not write the tile if the data in that buffer is not occluded by the incoming tile of updated pixel shader VRS data.

Each of the units illustrated in the figures represent hardware circuitry configured to perform the operations described herein, and certain units of the graphics processing pipeline 300 are programmable and can thus execute programs.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing shader operations, the method comprising:
performing pixel shading at a shading rate defined by pixel shader variable rate shading ("VRS") data;
updating the pixel VRS data that indicates one or more shading rates for one or more tiles based on whether tiles of the one or more tiles include triangle edges or do not include triangle edges, to generate updated VRS data; and
writing to a VRS rate feedback buffer based on the updated VRS data.

2. The method of claim 1, wherein:
the VRS rate feedback buffer includes indications for each tile of the one or more tiles, wherein the indications indicate either a shading rate for a tile based on the pixel shader variable rate shading data or that the tile includes a triangle edge.

3. The method of claim 1, further comprising:
performing a post-processing task utilizing the VRS rate feedback buffer to reduce a rate at which the post-processing task occurs for at least one tile.

4. The method of claim 3, wherein utilizing the VRS rate feedback buffer to reduce a rate at which the post-processing task occurs for at least one tile comprises:
if the VRS rate feedback buffer does not indicate that the at least one tile includes a triangle edge, then performing the post-processing task at a shading rate referred to in the VRS rate feedback buffer; and
if the VRS rate feedback buffer does indicate that the at least one tile includes a triangle edge, then performing the post-processing task at a shading rate of a render target.

5. The method of claim 1, wherein updating the pixel shader VRS data for a tile of the one or more tiles includes:
determining that a coarse depth test indicates that the tile is partially covered by a triangle; and
in response to the determining, modifying a VRS data for the tile to indicate that the tile includes a triangle edge.

6. The method of claim 1, wherein updating the pixel shader VRS data for a tile of the one or more tiles includes:
determining that a coarse depth test indicates that the tile is fully covered by a triangle; and
in response to the determining, setting, as a shading rate for the tile in updated VRS data, a shading rate of the tile in the pixel shader variable rate shading data.

7. The method of claim 1, wherein:
the VRS data includes an indication that a tile of the one or more tiles is fully covered; and
updating the pixel shader VRS data for the tile of the one or more tiles includes:
determining that a pixel shader stage has modified coverage for at least one fragment in the tile to indicate that the at least one fragment is not covered; and
in response to the determining, modifying the pixel shader VRS data to indicate that the tile includes a triangle edge.

8. The method of claim 1, wherein:
the VRS data includes an indication that a tile of the one or more tiles is fully covered; and
updating the pixel shader VRS data for the tile of the one or more tiles includes:
determining that a pixel shader stage has not modified coverage for any fragment in the tile to indicate that the at least one fragment is not covered; and
in response to the determining, setting, as a shading rate for the tile in updated VRS data, a shading rate of the tile in the pixel shader variable rate shading data.

9. The method of claim 1, wherein writing the VRS rate feedback buffer based on the updated VRS data comprises:
writing first updated VRS data for a tile having a first depth to the VRS rate feedback buffer; and
in response to determining that second updated VRS data includes data that occludes the first updated VRS data, overwriting the first updated VRS data with the second updated VRS data in the VRS rate feedback buffer.

10. A graphics processing pipeline, comprising:
pixel shader stage circuitry configured to perform pixel shading at a shading rate defined by pixel shader variable rate shading ("VRS") data; and
output merger stage circuitry configured to:
update the pixel VRS data that indicates one or more shading rates for one or more tiles based on whether tiles of the one or more tiles include triangle edges or do not include triangle edges, to generate updated VRS data; and
write to a VRS rate feedback buffer based on the updated VRS data.

11. The graphics processing pipeline of claim 10, wherein:
the VRS rate feedback buffer includes indications for each tile of the one or more tiles, wherein the indications indicate either a shading rate for a tile based on the pixel shader variable rate shading data or that the tile includes a triangle edge.

12. The graphics processing pipeline of claim 10, further comprising post-processing circuitry configured to:
perform a post-processing task utilizing the VRS rate feedback buffer to reduce a rate at which the post-processing task occurs for at least one tile.

13. The graphics processing pipeline of claim 12, wherein utilizing the VRS rate feedback buffer to reduce a rate at which the post-processing task occurs for at least one tile comprises:
if the VRS rate feedback buffer does not indicate that the at least one tile includes a triangle edge, then performing the post-processing task at a shading rate referred to in the VRS rate feedback buffer; and
if the VRS rate feedback buffer does indicate that the at least one tile includes a triangle edge, then performing the post-processing task at a shading rate of a render target.

14. The graphics processing pipeline of claim 10, wherein updating the pixel shader VRS data for a tile of the one or more tiles includes:
determining that a coarse depth test indicates that the tile is partially covered by a triangle; and
in response to the determining, modifying a VRS data for the tile to indicate that the tile includes a triangle edge.

15. The graphics processing pipeline of claim 10, wherein updating the pixel shader VRS data for a tile of the one or more tiles includes:
determining that a coarse depth test indicates that the tile is fully covered by a triangle; and in response to the determining, setting, as a shading rate for the tile in updated VRS data, a shading rate of the tile in the pixel shader variable rate shading data.

16. The graphics processing pipeline of claim 10, wherein:
the VRS data includes an indication that a tile of the one or more tiles is fully covered; and
updating the pixel shader VRS data for the tile of the one or more tiles includes:
determining that a pixel shader stage has modified coverage for at least one fragment in the tile to indicate that the at least one fragment is not covered; and
in response to the determining, modifying the pixel shader VRS data to indicate that the tile includes a triangle edge.

17. The graphics processing pipeline of claim 10, wherein:
the VRS data includes an indication that a tile of the one or more tiles is fully covered; and
updating the pixel shader VRS data for the tile of the one or more tiles includes:
determining that a pixel shader stage has not modified coverage for any fragment in the tile to indicate that the at least one fragment is not covered; and
in response to the determining, setting, as a shading rate for the tile in updated VRS data, a shading rate of the tile in the pixel shader variable rate shading data.

18. The graphics processing pipeline of claim 10, wherein writing the VRS rate feedback buffer based on the updated VRS data comprises:

writing first updated VRS data for a tile having a first depth to the VRS rate feedback buffer; and
in response to determining that second updated VRS data includes data that occludes the first updated VRS data, overwriting the first updated VRS data with the second updated VRS data in the VRS rate feedback buffer.

19. A non-transitory computer-readable medium storing instructions that, when executed by a processor, cause the processor to perform shader operations, the shading operations comprising:
performing pixel shading at a shading rate defined by pixel shader variable rate shading ("VRS") data;
updating the pixel VRS data that indicates one or more shading rates for one or more tiles based on whether tiles of the one or more tiles include triangle edges or do not include triangle edges, to generate updated VRS data; and
writing to a VRS rate feedback buffer based on the updated VRS data.

20. The non-transitory computer-readable medium of claim 19, wherein:
the VRS rate feedback buffer includes indications for each tile of the one or more tiles, wherein the indications indicate either a shading rate for a tile based on the pixel shader variable rate shading data or that the tile includes a triangle edge.

* * * * *